United States Patent Office 3,483,183
Patented Dec. 9, 1969

3,483,183
PROCESS FOR ISOLATING DRY, WATER-SOLUBLE AZO DYES
Milton R. Ingleman, Hamburg, N.Y., assignor to Allied Chemical Corporation, New York, N.Y., a corporation of New York
No Drawing. Filed Aug. 20, 1965, Ser. No. 481,417
Int. Cl. C07c 107/00
U.S. Cl. 260—208                                6 Claims

ABSTRACT OF THE DISCLOSURE

An improved process for preparing dry, water soluble dyestuffs having high tinctorial value comprises treating the dyestuff, which has been salted out of solution and is contaminated with an aqueous mother liquor, with a low boiling, water miscible organic solvent wash liquor which is substantially nonsolvent for the dyestuff until at least about 75% of the mother liquor has been displaced, and then drying said dyestuff.

---

Water soluble dyestuffs, particularly water soluble azo dyestuffs and especially edible water soluble monoazo dyestuffs, are generally isolated in solid state by crystallization from a concentrated aqueous salt solution. The resulting color slurry is concentrated in cake form by filtering or centrifuging to separate the crystal magma from the mother liquor. The mother liquor adhering to the crystal magma is displaced by washing the cake with an aqueous salt solution. The washed cake is dried resulting in a dyestuff composition containing small but significant quantities of salt. Moreover, the wet cake during drying contains sufficient water to dissolve substantial quantities of the dyestuff which, as the drying proceeds and the water evaporates, precipitates out in a crystal form quite different from that obtained during the original crystallization. The dried dyestuff is thus a mixture not only of salt and colorant but also of at least two different crystal forms of the latter. In most instances, the tinctorial value of a dyestuff in the dry state differs to a significant degree depending upon its crystalline state. Amorphous material, such as is obtained by evaporation of solutions of the colorant, is generally characterized by relatively poor tinctorial value.

As is well known, many water soluble dyestuffs are used to color, in the dry state, a variety of products. Particularly, many edible products are marketed in the so-called "instant" form as dry comminuted mixtures the acceptability of which are enhanced by coloration with water soluble edible dyestuffs. These products, many of which contain large proportions of sugar, are prepared by dry mixing the several ingredients with the dye. It is, of course, highly desirable that the dyes used not only be completely soluble in the intended environment but also should possess high tinctorial strength in the dry state.

It is therefore an object of the present invention to provide an effective process for the preparation of water soluble dyestuffs of high tinctorial strength in the dry state.

Another object is to provide a process for the preparation of solid particulate water soluble dyestuffs by which the crystal structure of the dyestuff is not altered during the drying step.

A further object of this invention is to provide an effective and economical process for the preparation of edible water soluble monoazo dyestuffs of high tinctorial strength in the dry state.

Other objects and advantages will be obvious from the following description.

I have made the surprising discovery that water soluble dyestuffs and particularly non-toxic or edible water soluble dyestuffs of high tinctorial value in the dry state can be obtained by displacing most, i.e. at least about 75 percent by weight of the aqueous salt-containing mother liquor adhering to the dyestuff after separation from the mother liquor by washing the dyestuff-adherent mother liquor mixture with a low boiling water miscible solvent, e.g. ethanol, until the liquid portion of the mixture contains less than about 25 percent by weight of said aqueous salt-containing mother liquor.

The water soluble dyestuff usually contains sulfonic acid and/or carboxylic acid groups which are present in salt form, e.g. alkali metal sulfonates and carboxylates and as such are practically insoluble in the water miscible solvent which has been used to displace the aqueous liquor from the dyestuff mixture. On drying, the dyestuff-solvent-aqueous liquor mixture, practically none, i.e. less than about 2 percent of the dyestuff is dissolved by the aqueous solvent and hence, the original crystal structure of the dyestuff is substantially preserved. In this manner the tinctorial value of the dyestuff is enhanced since none or practically none of the amorphous material is formed.

The preparation of water soluble monoazo dyestuffs is well known. Generally an arylamine is diazotized with nitrous acid and coupled into an aryl amine or phenol in acid or alkaline media. The diazo component and/or the coupling component contain water solubilizing groups (i.e. sulfo or carboxy groups) which are in, or converted to, salts. By the addition of an inorganic salt, e.g. sodium chloride, the solubility of the dyestuff is reduced ("salted out"), and by cooling the mass a crystalline slurry of the dye is obtained.

This slurry is concentrated by filtering or centrifuging to obtain a cake or concentrate which is a mixture of dyestuff crystals and adhering mother liquor. The latter was formerly displaced by washing the cake with a cold solution of an inorganic salt (usually sodium chloride), and the resultant washed mixture, containing about 10 to 90 percent solids is dried in a circulating air dryer. During the drying operation a considerable portion of the dye crystals is dissolved in the hot liquid portion of the mass and the resulting solution, upon evaporation of the liquid, deposits the dye solute in a non-crystalline or amorphous form which is of lower tinctorial value than the original crystalline modification of the dyestuff.

In accordance with a preferred mode of carrying out the process of this invention, the cake or concentrate of the dyestuff and adhering mother liquor is washed with ethanol until the major portion, at least about 75 percent of the adhering mother liquor, has been displaced with alcohol. This point is reached when the wash liquor emanating from a dye cake has a specific gravity, at about 20° C., of less than 0.9. The liquid portion of the washed cake or concentrate, which represents 10 to 90 percent by weight of the mixture, contains about 75 percent or more alcohol and 25 percent or less mother liquor. Preferably, the amount of adherent mother liquor present in the dyestuff/low boiling solvent/mother liquor concentrate is such that no more than about 2 percent of the dyestuff crystals will be dissolved in said mother liquor at the drying temperature of the concentrate. This cake is dried, during which little or no significant amount of the dyestuff dissolves in the hot liquor and consequently no significant amount of the crystalline dye solids is converted to the undesirable amorphous form.

I have found that the tinctorial value (measured in dry mixes) of the improved dyestuff is about two to three times that of the dyestuff prepared by the prior art procedures.

The process of the application is applicable to water soluble dyestuffs. By the term "water soluble" it is intended to include those organic dyestuffs which are soluble in water at 20° C. to the extent of about 5 percent by weight or more and which contain at least one sulfonic acid or carboxylic acid substituent. Water soluble azo dyestuffs containing two or more water solubilizing groups are particularly adapted for use in this invention and edible water soluble monoazo dyestuff (of the so-called "Food Colors" group) are especially preferred. Typical examples of these classes of dyestuffs are the following:

| | |
|---|---|
| FD & C Yellow 5 | CI Food Yellow 4 |
| FD & C Yellow 6 | CI Food Yellow 3 |
| FD & C Red 2 | CI Food Red 9 |
| Fast Cyanone 3R | CI Acid Blue 118 |
| Fast Light Yellow 2G | CI Acid Yellow 17 |
| Wool Orange A Conc. | CI Acid Orange 7 |
| Fast Crimson GR | CI Acid Red 1 |
| Erie Black GX00 | CI Direct Black 38 |
| Erie Congo 4B | CI Direct Red 28 |
| Niagara Blue 2B | CI Direct Blue 6 |
| Erie Yellow Y | CI Direct Yellow 12 |

The low boiling water miscible solvent used to displace the salt-containing mother liquor from the dyestuff cake should have a boiling point below about 180° C. and should be completely miscible with water. The solvent should not dissolve any significant amount of the dyestuff even at the temperature of the drying operation. Lower hydrocarbon alkanols, such as methanol, ethanol, isopropanol, are preferred because of their effectiveness, availability, and moderate cost. Typical of these desirable solvents are the following: methanol, ethanol, isopropanol, n-propanol, 1-butanol, acetone, methylethylketone, and dioxane.

Mixtures of the foregoing solvents and equivalent compounds are within the scope of this invention.

The following examples serve to illustrate the process of the present invention. Parts and percentages are by weight and temperatures are given in degrees centigrade.

Example I

A mixture of an aqueous paste of Tartrazine prepared by condensing 1 mol of dihydroxytartaric acid with 2 mols of phenylhydrazine sulfonic acid containing 1420 parts of color and 1180 parts water was mixed with 10 parts of disodium phosphate and 8000 parts of water and heated to 90°. Soda ash was added to the mixture until it was just slightly acid. Following the addition of 10 parts of disodium phosphate, soda ash was added to mass until it reacted just alkaline to Brilliant Yellow indicator. The hot (85° to 90°) mixture was sludge filtered through a press precoated with Solka-Floc (a purified wood-cellulose filter aid).

The clarified filtrate was agitated and cooled to 50° at which temperature sodium chloride was added to adjust the density of the solution to 19° Bé. at 50°. The mass was agitated at 50° for about 10 minutes, and then seeded with crystals Tartrazine to induce crystallization. The mixture was agitated and cooled to 0° to 5°.

The color slurry was filtered and the filter-cake was washed with cold 0° to 2° aqueous sodium chloride having a density of 4.5 to 5.0° Bé. at 0° and which was saturated with Tartrazine. The cake was blown "dry" to remove a portion of the adherent liquor and then the cake was washed with a continuous flow of ethanol until the specific gravity of the wash liquor was 0.9 to 20°. The washed cake was blown "dry" and then dried at 70° to 80°, in a circulating air drier.

The dried product, FD & C Yellow #5, is suitable for use in coloring dry mixes comprising sugar and when so used imparts exceptionally high tinctorial values to the dry mix.

Example II

A mixture of 0.1 part of the yellow dyestuff prepared in Example I above and 680 parts of sugar were thoroughly blended together.

A similar mixture of the same yellow dyestuff but one which had been prepared in the conventional manner, i.e. the mother liquor was displaced by washing the filter cake with an aqueous sodium chloride solution rather than with an organic solvent, was prepared.

The two mixtures were compared by visual means, e.g. small portions of each mixture were poured onto white filter paper and examined visually. The first mixture, i.e. the one containing the dyestuff prepared according to Example I, was rated "much stronger" than that containing the conventionally prepared dyestuff. The degree of color and brightness of shade was visually evaluated on the following scale:

very yellow
very much yellower
much yellower
considerably yellower
slightly yellower
equal Example III In a similar manner to that described in Example II above, FD&C Yellow #6 (CI Food Yellow 3), prepared in accordance with this invention, was admixed with sugar and the resulting mixture compared with a similar mixture containing this dyestuff prepared according to the conventional procedure.

The first mxture was rated "considerably yellower and brighter" in shade and "appreciably stronger" in shade than the second mixture as measured on the scale of Example II.

It can thus be seen that an efficient and economical procedure has been devised for the preparation of water soluble dyestuffs of exceptional tinctorial strength.

My invention has been described and illustrated in the above specification and examples. As will be obvious to those skilled in the art the details set out above can be varied over considerable ranges without departing from the scope or spirit of my invention.

For example, the cake obtained after concentrating by filtering or centrifuging the mixture of dyestuff crystals and mother liquor can be reslurried in a suitable water miscible organic solvent and the resultant slurry concentrated by filtration or centrifugation. The resulting cake contains a lesser amount of adhering aqueous salt containing mother liquor and thus this well known modification of reslurrying the cake provides a simple and effective means for assisting in or even replacing the above described step of washing the cake on the filter or centrifuge.

I claim:

1. In the process for preparing dry, water soluble azo dyestuffs which comprises isolating a slurry of dyestuff by crystallization from concentrated salt solutions, concentrating said slurry to separate crystal magma from the aqueous mother liquor, displacing adhering mother liquor from said concentrate by washing and drying said concentrate to obtain the desired product, the improvement which comprises effecting said washing step with an inert water miscible organic solvent wash liquor which boils below 180° C. and is substantially nonsolvent for the dyestuff until at least about 75%, by weight, of the aqueous salt-containing mother liquor adhering to the dyestuff has been displaced by said wash liquor.

2. The process of claim 1 wherein the water soluble dyestuff is a monoazo dyestuff.

3. The process of claim 1 wherein the low boiling, water miscible, organic solvent wash liquor is a lower alkanol.

4. The process of claim 3 wherein the lower alkanol is ethanol.

5. In the process for preparing dry, water soluble, azo dyestuffs which comprises isolating a slurry of an azo dyestuff by crystallization from concentrated salt solutions, concentrating said slurry to separate crystal magma from the aqueous mother liquor, displacing adhering mother liquor from the concentrate by washing and drying said concentrate to obtain the desired product, the improvement which comprises effecting said washing with a water miscible organic solvent boiling below 180° C. until the wash liquor emanating from said dyestuff has a specific gravity at about 20° C. no higher than 0.9 and drying said dyestuff, said organic solvent being substantially nonsolvent for the dyestuff at the temperatures used during said washing and said drying.

6. The process of claim 5 wherein the organic solvent is a lower alkanol.

References Cited

UNITED STATES PATENTS

| | | | |
|---|---|---|---|
| 324,630 | 8/1885 | Zeigler | 260—163 |
| 365,667 | 6/1887 | Bottiger | 260—182 |
| 456,897 | 7/1891 | Martius | 260—182 |
| 458,283 | 8/1891 | Kuzel | 260—182 |
| 717,550 | 1/1903 | Dedichen | 260—171 |
| 901,675 | 10/1908 | Boniger | 260—163 |
| 2,170,262 | 8/1939 | Graenacher et al. | 260—208 |
| 2,359,862 | 10/1944 | Linch | 260—208 XR |
| 2,374,063 | 4/1945 | Williams | 260—208 |
| 2,564,225 | 8/1951 | Mayers | 260—205 |
| 2,988,544 | 6/1961 | Frey et al. | 260—208 XR |
| 3,120,508 | 2/1964 | Braun et al. | 260—208 XR |
| 3,124,565 | 3/1964 | Schilling et al. | 260—208 XR |
| 3,169,955 | 2/1965 | Siebert et al. | 260—208 XR |

FOREIGN PATENTS

| | | |
|---|---|---|
| 118,655 | 4/1892 | Germany. |
| 3,994 | 4/1897 | Great Britain. |
| 503,666 | 4/1939 | Great Britain. |
| 1,249,665 | 11/1960 | France. |
| 1,400,909 | 4/1965 | France. |

OTHER REFERENCES

Hofmann: Ber. Deut. Chem., vol. 10, pp. 1378 to 1381 (1877).

Whitmore et al.: J. Am. Chem. Soc., vol. 50, pp. 1500 to 1503 (1937).

FLOYD D. HIGEL, Primary Examiner

U.S. Cl. X.R.

260—162, 200, 195, 177, 178, 182, 171, 163, 197, 199, 184, 190